(12) United States Patent
Dailey et al.

(10) Patent No.: US 10,513,982 B2
(45) Date of Patent: Dec. 24, 2019

(54) ROTORCRAFT HAVING INCREASED ALTITUDE DENSITY CEILING

(71) Applicant: Bell Helicopter Textron Inc., Fort Worth, TX (US)

(72) Inventors: Zachary Edwin Dailey, Fort Worth, TX (US); Frank Bradley Stamps, Fort Worth, TX (US); Martin Peryea, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 345 days.

(21) Appl. No.: 15/439,728

(22) Filed: Feb. 22, 2017

(65) Prior Publication Data
US 2018/0238235 A1     Aug. 23, 2018

(51) Int. Cl.
| B64D 33/08 | (2006.01) |
| F02C 7/36 | (2006.01) |
| F02C 7/141 | (2006.01) |
| F02C 7/232 | (2006.01) |
| F02C 9/40 | (2006.01) |

(Continued)

(52) U.S. Cl.
CPC .......... *F02C 7/141* (2013.01); *B64C 27/006* (2013.01); *B64D 33/08* (2013.01); *F02C 3/30* (2013.01); *F02C 7/143* (2013.01); *F02C 7/16* (2013.01); *F02C 7/22* (2013.01); *F02C 7/232* (2013.01); *F02C 7/36* (2013.01); *F02C 9/28* (2013.01); *F02C 9/40* (2013.01); *B64D 2033/024* (2013.01); *F05D 2220/329* (2013.01);

(Continued)

(58) Field of Classification Search
CPC ... B64D 33/08; B64D 2033/024; F02C 7/141; F02C 7/143; F02C 7/1435; F02C 9/18; F02C 9/28; F02C 9/40
See application file for complete search history.

(56) References Cited

U.S. PATENT DOCUMENTS 2,929,201 A    3/1960 Lindsey
5,803,022 A    9/1998 Nelson et al.
(Continued)

OTHER PUBLICATIONS

Van Fossen, G.J.; "The Feasibility of Water injection into the Turbine Coolant to Permit Gas Turbine Contingency Power for Helicopter Application" Journal of Engineering for Power; Jul. 1983; vol. 105 pp. 635-642.

*Primary Examiner* — Philip J Bonzell
*Assistant Examiner* — Tye William Abell
(74) *Attorney, Agent, or Firm* — Lawrence Youst PLLC

(57) ABSTRACT

A rotorcraft has a low density altitude flight mode and a high density altitude flight mode. The rotorcraft includes a turboshaft engine forming a gas path in sequence through an air inlet section, a compressor section, a combustor section, a turbine section and an exhaust section. A drive system is coupled to the engine and is operable responsive to rotation of at least a portion of the turbine section. A rotor is coupled to the drive system and is operable to receive torque and rotational energy therefrom. A fuel injection system supplies fuel to the combustor section. An oxidizer injection system and a coolant injection system are used to selectively inject an oxidizer and a coolant into the gas path when it is desired to operate the rotorcraft in the high density altitude flight mode, thereby increasing the altitude density ceiling of the rotorcraft for maneuvers including takeoffs and landings.

20 Claims, 7 Drawing Sheets

(51) Int. Cl.
  *F02C 7/16* (2006.01)
  *F02C 3/30* (2006.01)
  *F02C 7/22* (2006.01)
  *F02C 7/143* (2006.01)
  *F02C 9/28* (2006.01)
  *B64C 27/00* (2006.01)
  *B64D 33/02* (2006.01)

(52) U.S. Cl.
  CPC ....... *F05D 2260/212* (2013.01); *Y02T 50/671* (2013.01); *Y02T 50/675* (2013.01)

(56) References Cited

U.S. PATENT DOCUMENTS

| | | | |
|---|---|---|---|
| 5,867,977 A | 2/1999 | Zachary et al. | |
| 5,930,990 A | 8/1999 | Zachary et al. | |
| 6,324,827 B1 | 12/2001 | Basu et al. | |
| 6,370,862 B1 | 4/2002 | Cheng | |
| 6,644,015 B2 | 11/2003 | McKinney | |
| 6,824,710 B2 * | 11/2004 | Viteri | F01K 21/047 252/373 |
| 6,973,774 B1 | 12/2005 | Wood | |
| 7,040,083 B2 | 5/2006 | Horii et al. | |
| 7,305,816 B2 | 12/2007 | Freese et al. | |
| 8,825,342 B2 | 9/2014 | Schaeffer et al. | |
| 9,086,016 B2 | 7/2015 | Mast et al. | |
| 9,488,109 B2 | 11/2016 | Sowden | |
| 2003/0079463 A1 * | 5/2003 | McKinney | F02K 9/78 60/204 |
| 2010/0251692 A1 | 10/2010 | Kinde | |
| 2014/0129111 A1 * | 5/2014 | Schaeffer | F01D 17/06 701/100 |
| 2015/0315965 A1 * | 11/2015 | Moine | F02C 3/305 60/775 |
| 2018/0038281 A1 * | 2/2018 | Eifert | F01D 15/10 |

* cited by examiner

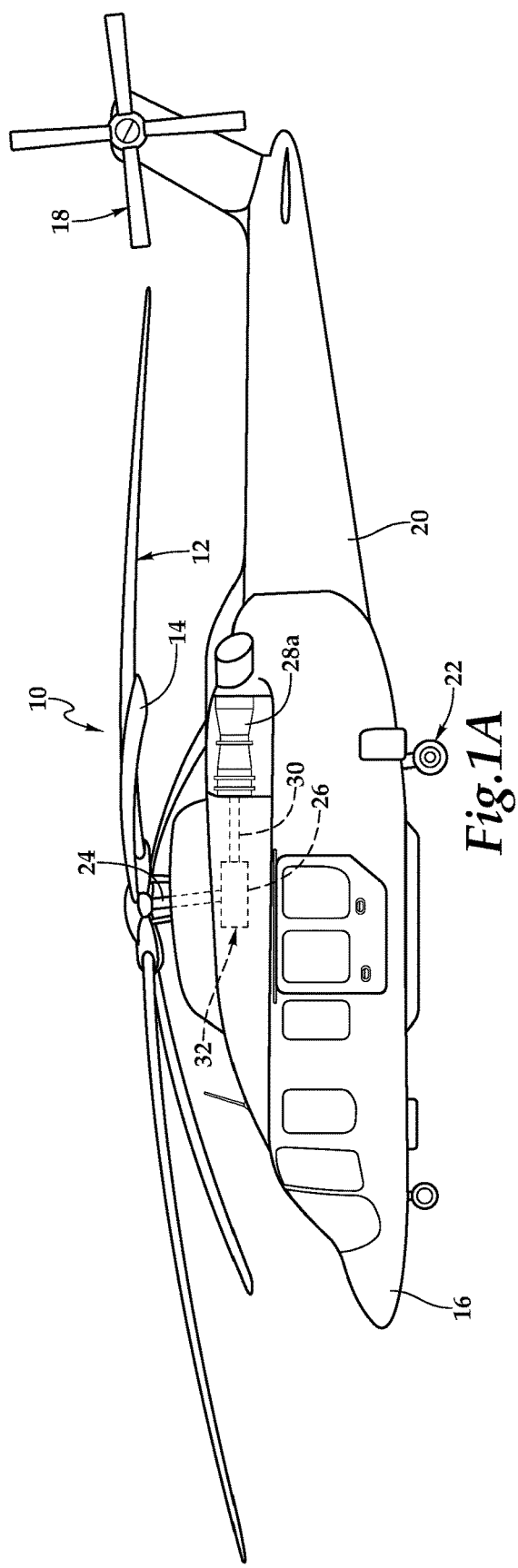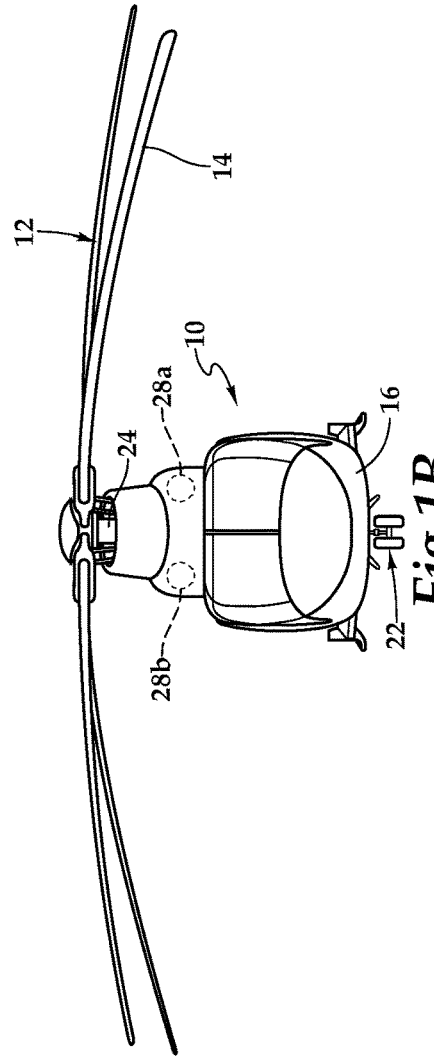

ROTORCRAFT HAVING INCREASED ALTITUDE DENSITY CEILING

TECHNICAL FIELD OF THE DISCLOSURE

The present disclosure relates, in general, to expanding the flight envelope of rotorcraft having turboshaft engines for flight operations in hot and/or high environments and, in particular, to increasing the altitude density ceiling of such rotorcraft for flight operations including takeoffs and landings.

BACKGROUND

Certain rotorcraft are capable of taking off, hovering and landing vertically. One such rotorcraft is a helicopter, which has one or more main rotors that provide lift and thrust to the aircraft. The main rotors not only enable hovering and vertical takeoff and landing, but also enable forward, backward and lateral flight. These attributes make helicopters highly versatile for use in congested, isolated or remote areas. Another such rotorcraft is a tiltrotor aircraft, which has a set of proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane.

It has been found, however, that hot and/or high environments present numerous challenges for rotorcraft. For example, as the altitude and temperature increase, rotorcraft have reduced range, reduced payload capacity, reduced maneuverability and reduced station time. In addition, operations at high density altitudes have increased power requirements and increased fuel burn. One solution for increasing the altitude density ceiling of rotorcraft is the use of larger, more powerful engines. This solution, however, results in a permanent weight penalty and a decrease in rotorcraft efficiency. Accordingly, a need has arisen for rotorcraft having an increased altitude density ceiling without the weight penalty or decreased efficiency of using larger engines.

SUMMARY

In a first aspect, the present disclosure is directed to a rotorcraft having a low density altitude flight mode and a high density altitude flight mode. The rotorcraft includes a turboshaft engine forming a gas path in sequence through an air inlet section, a compressor section, a combustor section, a turbine section and an exhaust section. A drive system is coupled to the engine. The drive system is operable responsive to rotation of at least a portion of the turbine section. A rotor is operable to receive torque and rotational energy from the drive system. A fuel injection system is coupled to the engine and is operable to inject fuel into the combustor section of the engine. An oxidizer injection system is coupled to the engine and is operable to selectively inject an oxidizer into the gas path. A coolant injection system is coupled to the engine and is operable to selectively inject a coolant into the gas path. The rotorcraft is operating in the low density altitude flight mode when the oxidizer and the coolant are not injected into the gas path. The rotorcraft is operating in the high density altitude flight mode when the oxidizer and the coolant are injected into the gas path.

In some embodiments, the oxidizer injection system and the coolant injection system are coupled to the engine such that the oxidizer and the coolant are injected into the gas path upstream of the compressor section. In other embodiments, the oxidizer injection system and the coolant injection system are coupled to the engine such that the oxidizer and the coolant are injected downstream of the compressor section. In further embodiments, the oxidizer and the coolant injection systems are coupled to the engine such that one of the oxidizer and the coolant is injected upstream of the compressor section and the other of the oxidizer and the coolant is injected downstream of the compressor section. In certain embodiments, the oxidizer injection system and the coolant injection system may be an integrated fluid injection system. In some embodiments, the oxidizer may be nitrous oxide, nitrogen tetroxide, hydrogen peroxide, liquid oxygen or liquid air. In certain embodiments, the coolant may be water, a water-alcohol mixture or ammonia.

In some embodiments, the turbine section may include a compressor turbine and a power turbine, wherein the compressor turbine drives the compressor section and the power turbine drives the drive system. In certain embodiments, one or more pilot operated controllers may be operably coupled to the oxidizer injection system and the coolant injection system to provide pilot authority to selectively inject the oxidizer and the coolant into the gas path. In such embodiments, the pilot operated controllers may provide pilot authority to selectively control the amount of oxidizer and coolant injected into the gas path. In some embodiments, operating in the high density altitude flight mode may simulate a reduction in the density altitude experienced by the engine, thereby increasing the altitude density ceiling of the rotorcraft. In certain embodiments, the rotor may be a main rotor of a helicopter. In other embodiments, the rotor may be a proprotor of a tiltrotor aircraft.

In a second aspect, the present disclosure is directed to a method of operating a rotorcraft in a high density altitude flight mode. The method includes establishing a gas path in sequence through an air inlet section, a compressor section, a combustor section, a turbine section and an exhaust section of a turboshaft engine; operating a drive system responsive to rotation of at least a portion of the turbine section; rotating a rotor responsive to receiving torque and rotational energy from the drive system; and injecting an oxidizer and a coolant into the gas path to simulate a reduction in the density altitude experienced by the engine, thereby increasing the altitude density ceiling of the rotorcraft.

The method may also include injecting nitrous oxide and a water-alcohol mixture into the gas path; injecting the oxidizer and the coolant upstream of the compressor section; injecting the oxidizer and the coolant downstream of the compressor section and/or increasing a power output of the engine between about 20 percent and about 30 percent.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1B are schematic illustrations of an exemplary helicopter having a low altitude density flight mode and a high density altitude flight mode in accordance with embodiments of the present disclosure;

DETAILED DESCRIPTION

Figure 2A:
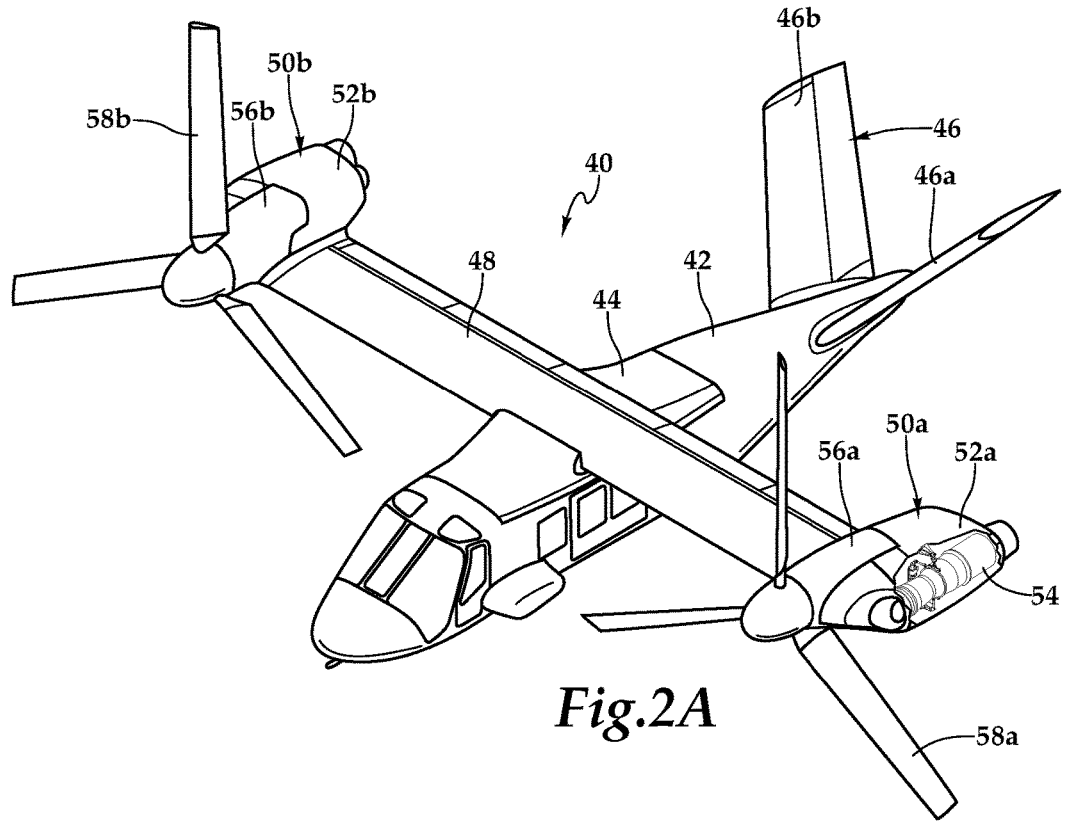
FIGS. 2A-2B are schematic illustrations of an exemplary tiltrotor aircraft having a low altitude density flight mode and a high density altitude flight mode in accordance with embodiments of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Referring now to FIGS. 1A-1B in the drawings, a rotorcraft depicted as helicopter 10 is schematically illustrated. Helicopter 10 has a main rotor 12 with a plurality of rotor blades 14. The pitch of rotor blades 14 can be collectively and cyclically manipulated to selectively control direction, thrust and lift of helicopter 10. Helicopter 10 includes a fuselage 16, an anti-torque system 18 and an empennage 20. Helicopter 10 has a landing gear system 22 to provide ground support for the aircraft. Main rotor 12 is supported atop helicopter 10 by a mast 24, which connects main rotor 12 to a main gearbox 26. Main gearbox 26 includes a plurality of gears that are mechanically coupled to a pair of engines 28a, 28b that provide mechanical and rotational energy to main gearbox 26 via respective driveshafts, only driveshaft 30 being visible in the figure. As used herein, the term "coupled" may include direct or indirect coupling by any means, including moving and nonmoving mechanical connections. Main gearbox 26 includes a transmission that is used to adjust the engine output from the driveshafts to a suitable rotational speed of mast 24 so that main rotor 12 rotates at a desired speed. Collectively, the driveshafts, the gearboxes including main gearbox 26 and mast 24 may be referred to as drive system 32 of helicopter 10. As discussed herein, the pilot of helicopter 10 can selectively inject an oxidizer and a coolant into the engines to temporarily simulate a reduction in the density altitude experienced by the engines, which temporarily increases the altitude density ceiling of helicopter 10. In this manner, helicopter 10 has a low density altitude flight mode when the oxidizer and the coolant are not injected into the engines and a high density altitude flight mode when the oxidizer and the coolant are injected into the engines.

Figure 2B:
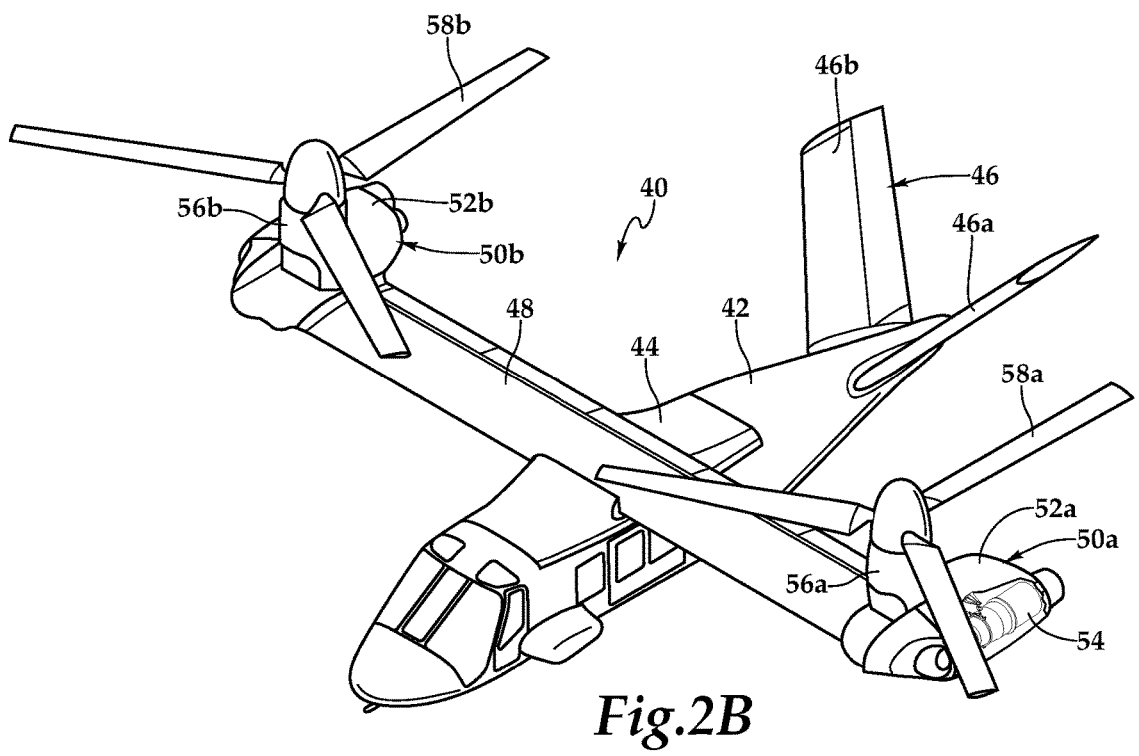

It should be appreciated that helicopter 10 is merely illustrative of a variety of rotorcraft that can implement the embodiments disclosed herein. Other rotorcraft implementations may include hybrid aircraft, unmanned aircraft, gyrocopters, single engine helicopters and tiltrotor aircraft, to name a few. For example, referring to FIGS. 2A-2B in the drawings, a rotorcraft depicted as tiltrotor aircraft 40 is schematically illustrated. Tiltrotor aircraft 40 includes a fuselage 42, a wing mount assembly 44 that is rotatable relative to fuselage 42 and a tail assembly 46 including rotatably mounted tail members 46a, 46b having control surfaces operable for horizontal and/or vertical stabilization during forward flight. A wing 48 is supported by wing mount assembly 44 and rotates with wing mount assembly 44 relative to fuselage 42 to operate tiltrotor aircraft 40 to a storage configuration. Located at outboard ends of wing 18 are propulsion assemblies 50a, 50b. Propulsion assembly 50a includes a nacelle depicted as fixed pylon 52a that houses an engine 54. In addition, propulsion assembly 50a includes a mast assembly 56a that is rotatable relative to fixed pylon 52a between a generally horizontal orientation, as best seen in FIG. 2A, a generally vertical orientation, as best seen in FIG. 2B. Propulsion assembly 50a also includes a proprotor assembly 58a that is rotatable relative to mast assembly 56a responsive to torque and rotational energy provided via a rotor hub assembly and drive system mechanically coupled to engine 54. Likewise, propulsion assembly 50b includes a nacelle depicted as fixed pylon 52b that houses an engine (not visible), a mast assembly 56b that is rotatable relative to fixed pylon 52b and a proprotor assembly 58b that is rotatable relative to mast assembly 56b responsive to torque and rotational energy provided via a rotor hub assembly and drive system mechanically coupled to the engine.

FIG. 2A illustrates tiltrotor aircraft 40 in airplane or forward flight mode, in which proprotor assemblies 58a, 58b are rotating in a substantially vertical plane to provide a forward thrust enabling wing 48 to provide a lifting force responsive to forward airspeed, such that tiltrotor aircraft 40 flies much like a conventional propeller driven aircraft. FIG. 2B illustrates tiltrotor aircraft 40 in helicopter or VTOL flight mode, in which proprotor assemblies 58a, 58b are rotating in a substantially horizontal plane to provide a lifting thrust, such that tiltrotor aircraft 40 flies much like a conventional helicopter. It should be appreciated that tiltrotor aircraft 40 can be operated such that proprotor assemblies 58a, 58b are selectively positioned between forward flight mode and VTOL flight mode, which can be referred to as a conversion flight mode. As discussed herein, the pilot of tiltrotor aircraft 40 can selectively inject an oxidizer and a coolant into the engines to temporarily simulate a reduction in the density altitude experienced by the engines, which temporarily increases the altitude density ceiling of tiltrotor aircraft 40. In this manner, tiltrotor aircraft 40 has a low density altitude flight mode when the oxidizer and the coolant are not injected into the engines and a high density altitude flight mode when the oxidizer and the coolant are injected into engines. Even though tiltrotor aircraft 40 has been described as having one engine in each fixed pylon 52a, 52b, it should be understood by those having ordinary skill in the art that other engine arrangements are possible and are considered to be within the scope of the present disclosure including, for example, having a single engine which may be housed within the fuselage that provides torque and rotational energy to both proprotor assemblies 58a, 58b.

Figure 3A:
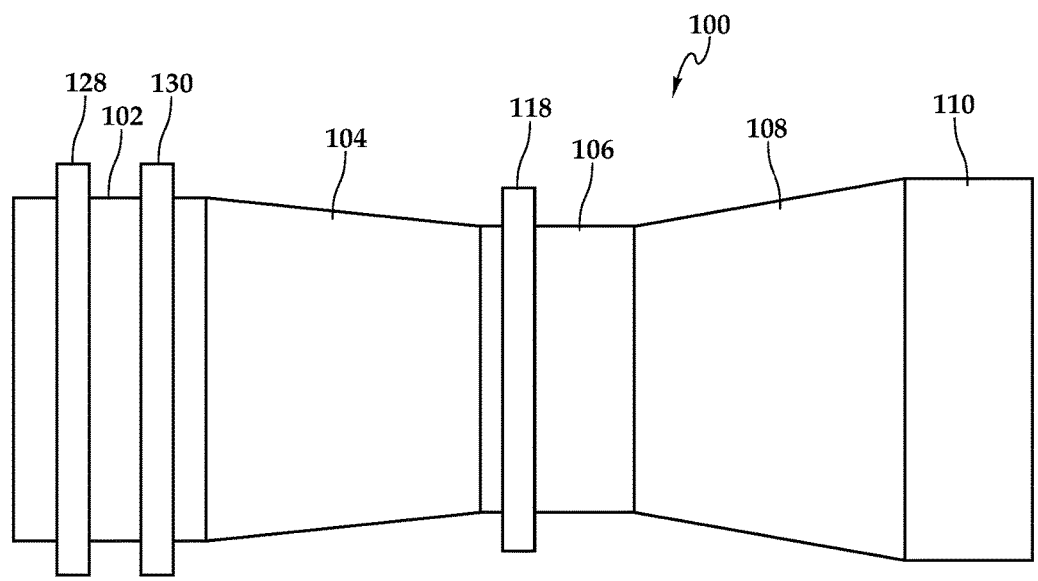
FIGS. 3A-3B are schematic side and partial cross sectional views of an exemplary turboshaft engine operable to provide a rotorcraft with a low altitude density flight mode and a high density altitude flight mode in accordance with embodiments of the present disclosure.
Figure 3B:
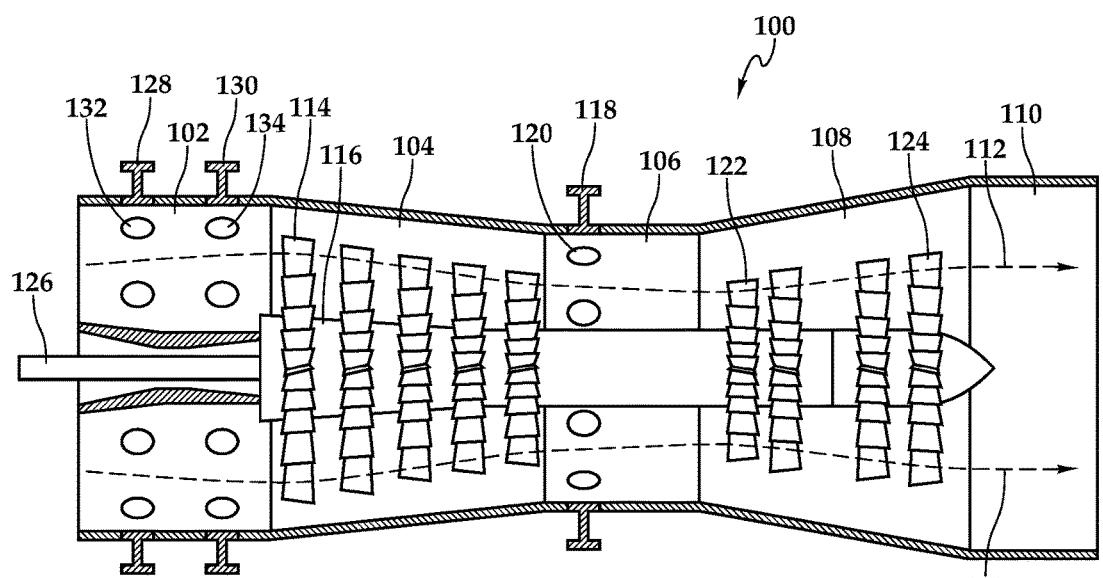

Referring now to FIGS. 3A-3B, a turboshaft engine 100 for use in a rotorcraft having a low density altitude flight mode and a high density altitude flight mode is disclosed in further detail. Turboshaft engine 100 includes an air inlet section 102, a compressor section 104, a combustor section 106, a turbine section 108 and an exhaust section 110, which collectively form a gas path, depicted as dashed lines 112, through turboshaft engine 100. In operation, ambient air drawn into air inlet section 102 enters compressor section 104 wherein the air is compressed. In the illustrated embodiment, compressor section 104 includes a five-stage axial compressor 114 having a series of rotating blades that are mounted on a compressor shaft 116. Preferably, compressor 114 includes a series of stationary blades (not pictured) after each set of rotating blades. The rotating blades accelerate the air while the stationary blades decelerate and redirect the air flow, thereby compressing the air. In certain implementations, compressor section 104 may achieve between about a 10:1 and about a 20:1 overall pressure ratio or other suitable pressure ratio. The compressed air is then mixed with fuel and ignited in combustor section 106. The fuel may be a liquid hydrocarbon fuel, such as diesel fuel, that is injected into combustor section 106 from a fuel injection system 118 including injectors 120 such as nozzles or other suitable injectors. The hot combustion gases expand and pass at high speed through turbine section 108 causing rotation of the turbine blades therein. In the illustrated embodiment, turbine section 108 includes a two-stage compressor turbine 122 and a two-stage power turbine 124. The blades of compressor turbine 122 are mounted on compressor shaft 116 such that rotation of compressor turbine 122 drives compressor 114. The blades of power turbine 124 are mounted on an output shaft 126 that is used to power the drive system and rotor of the associated rotorcraft. Preferably, compressor turbine 122 and power turbine 124 rotate independently of each other and are able to rotate at different speeds. Thus, a portion of the power generated by turbine section 108 is used to drive compressor 114 while the remaining power is available for propulsion of the rotorcraft.

While operating a rotorcraft at low density altitude, such as below 6000 feet and 95 degrees Fahrenheit, the rotorcraft should be capable of performing all required maneuvers with the power output of turboshaft engine 100 at or below its maximum continuous power rating. Operating a rotorcraft at high density altitude, such as above 6000 feet and 95 degrees Fahrenheit, however, may reduce the power output of turboshaft engine 100 by over 20 percent, over 30 percent or more. Thus, to insure safe takeoffs, safe landings, safe lifts at or near the gross weight capacity limit of the rotorcraft or to perform other maneuvers at high density altitude, turboshaft engine 100 includes power augmentation or emergency power capabilities that are referred to herein as a high density altitude flight mode of the rotorcraft. In the disclosed high density altitude flight mode of the rotorcraft, the power output of turboshaft engine 100 may be temporarily increased by between about 10 percent and about 20 percent, between about 20 percent and about 30 percent, between about 30 percent and about 40 percent, between about 40 percent and about 50 percent or more than 50 percent. In one preferred implementation, the power output of turboshaft engine 100 may be temporarily increased to produce approximately the same power that turboshaft engine 100 would produce at sea level standard day. Thus, operating in the high density altitude flight mode of the rotorcraft simulates a reduction in the density altitude experienced by turboshaft engine 100, thereby increasing the altitude density ceiling of the rotorcraft.

To achieve the high density altitude flight mode of the rotorcraft, turboshaft engine 100 includes an oxidizer injection system 128 and a coolant injection system 130. In the illustrated embodiment, both oxidizer injection system 128 and coolant injection system 130 are coupled to turboshaft engine 100 at air inlet section 102. In this configuration, oxidizer injection system 128 is operable to selectively inject an oxidizer into gas path 112 upstream of compressor 114 via injectors 132, which may be nozzles, orifice plates or other suitable injectors. Likewise, coolant injection system 130 is operable to selectively inject coolant into gas path 112 upstream of compressor 114 via injectors 134, which may be nozzles, orifice plates or other suitable injectors.

The oxidizer may be any suitable oxidizer such as nitrogen tetroxide, hydrogen peroxide, liquid oxygen or liquid air and may preferably be nitrous oxide. The oxidizer is used to increase the oxygen content of the gas stream entering combustor section 106 which allows a greater quantity of fuel to be burned, thereby increasing the temperature and volume of the combustion gases as well as the power output of turboshaft engine 100. As the increased temperature of the combustion gases may be detrimental to downstream elements such as the blades of compressor turbine 122 and power turbine 124, the coolant is injected to counteract this effect. The coolant may be any suitable coolant such as water or ammonia and may preferably be a water-alcohol mixture. The coolant is used to reduce the temperature of the air in gas path 112 due to vaporization of the coolant, which removes heat therefrom. As illustrated, when the coolant is injected upstream of compressor 114, the coolant has the added benefit of allowing more gas to be compressed to a higher pressure with no increase in the compressor power load, thereby further increasing the oxygen available for combustion. In addition, depending upon the coolant selected, all or a portion of the coolant may be combusted as fuel in combustor section 106.

Based on the rotorcraft maneuver being performed and the density altitude in which that maneuver is being performed, the rotorcraft may only need the augmented or emergency power capabilities for a few seconds or tens of seconds. For example, for landings and takeoffs above 6000 feet and 95 degrees Fahrenheit, less than 10 seconds of injection may provide the desired power boost to safely achieve the required maneuver. Due to the brief duration of the injection process, the volume of oxidizer and coolant and thus the tanks containing the oxidizer and coolant may be small, thereby imposing only a minimal weight penalty to the rotorcraft. Thus, a rotorcraft that includes one or more turboshaft engines with the disclosed oxidizer and coolant injection systems incorporated therewith is capable of operating in the low density altitude flight mode when the oxidizer and the coolant are not injected into the gas path but is also capable of operating in the high density altitude flight mode when the oxidizer and the coolant are injected into the gas path, thereby simulating a reduced density altitude environment for the turboshaft engines and increasing the altitude density ceiling of the rotorcraft.

Figure 4A:
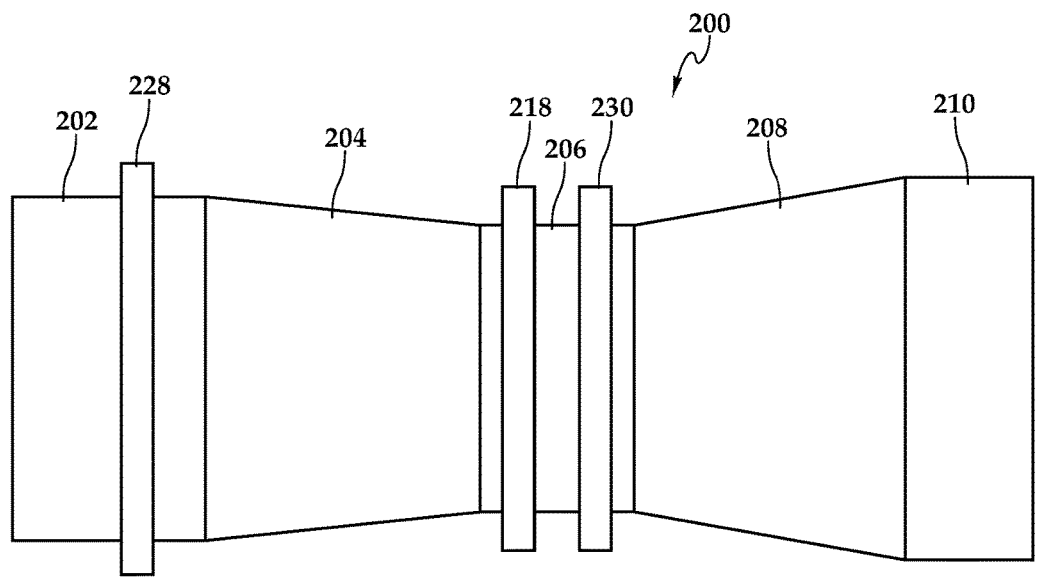
FIGS. 4A-4B are schematic side and partial cross sectional views of an exemplary turboshaft engine operable to provide a rotorcraft with a low altitude density flight mode and a high density altitude flight mode in accordance with embodiments of the present disclosure.
Figure 4B:
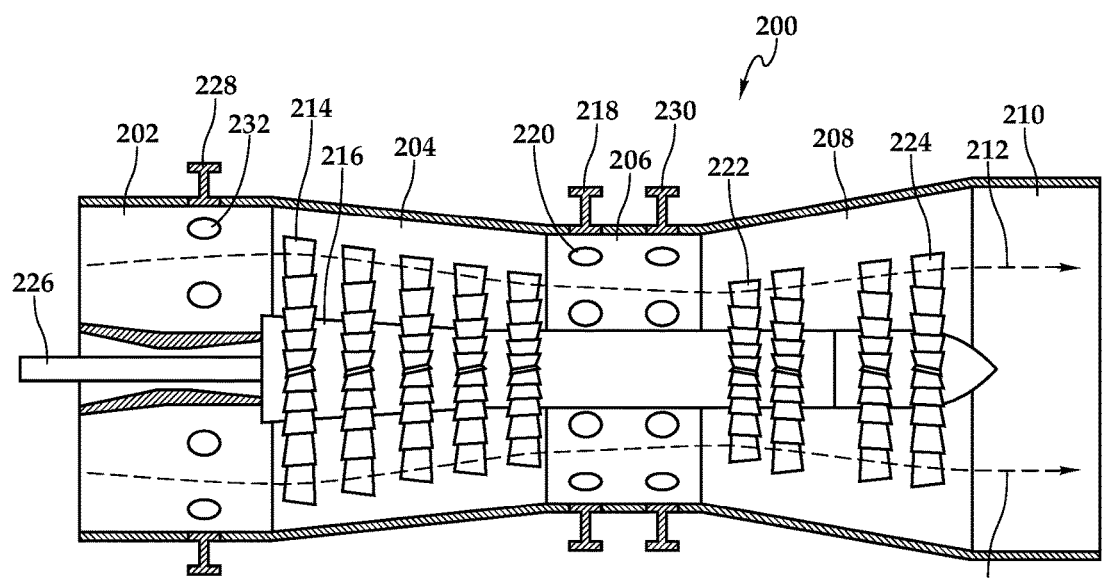

Referring now to FIGS. 4A-4B, a turboshaft engine 200 for use in a rotorcraft having a low density altitude flight mode and a high density altitude flight mode is disclosed in further detail. Turboshaft engine 200 includes an air inlet section 202, a compressor section 204, a combustor section 206, a turbine section 208 and an exhaust section 210, which collectively form a gas path, depicted as dashed lines 212, through turboshaft engine 200. In operation, ambient air drawn into air inlet section 202 enters compressor section 204 wherein the air is compressed. In the illustrated embodiment, compressor section 204 includes a five-stage axial compressor 214 having a series of rotating blades that are mounted on a compressor shaft 216. Preferably, compressor 214 includes a series of stationary blades (not pictured) after each set of rotating blades. The rotating blades accelerate the air while the stationary blades decelerate and redirect the air flow, thereby compressing the air. The compressed air is then mixed with fuel injected into combustor section 206 from a fuel injection system 218 including injectors 220 and ignited therein. The hot combustion gases expand and pass at high speed through turbine section 208 causing rotation of the turbine blades therein. In the illustrated embodiment, turbine section 208 includes a two-stage compressor turbine 222 and a two-stage power turbine 224. The blades of compressor turbine 222 are mounted on compressor shaft 216 such that rotation of compressor turbine 222 drives compressor 214. The blades of power turbine 224 are mounted on an output shaft 226 that is used to power the drive system and rotor of the associated rotorcraft.

To operate a rotorcraft at high density altitude, such as above 6000 feet and 95 degrees Fahrenheit, turboshaft engine 200 includes power augmentation or emergency power capabilities that are referred to herein as a high density altitude flight mode. In the disclosed high density altitude flight mode, for example, the power output of turboshaft engine 200 may be temporality increased to produce approximately the same power that turboshaft engine 200 would produce at sea level standard day. To achieve the high density altitude flight mode of the rotorcraft, turboshaft engine 200 includes an oxidizer injection system 228 and a coolant injection system 230. In the illustrated embodiment, oxidizer injection system 228 is coupled to turboshaft engine 200 at air inlet section 202 and is operable to selectively inject an oxidizer into gas path 212 upstream of compressor 214 via injectors 232. Coolant injection system 230 is coupled to turboshaft engine 200 such that coolant is selectively injected downstream of compressor 214 but upstream of compressor turbine 222 and compressor turbine 224. The injected oxidizer increases the oxygen content of the gas stream entering combustor section 206 which allows a greater quantity of fuel to be burned, thereby increasing the temperature and volume of the combustion gases as well as the power output of turboshaft engine 200. As the increased temperature of the combustion gases may be detrimental to downstream elements such as the blades of compressor turbine 222 and power turbine 224, the coolant is injected upstream of compressor turbine 222 and power turbine 224 to counteract this effect. The coolant reduced the temperature of the gas stream entering compressor turbine 222 and power turbine 224 due to vaporization of the coolant, which removes heat from the gas stream.

Alternatively or additionally, coolant may be injected into turbine section 208 between compressor turbine 222 and power turbine 224. As another alternative, fluid injection system 228 may represent the coolant injection system while fluid injection system 230 may represent the oxidizer injection system. In this case, the coolant is injected upstream of compressor 214 while the oxidizer is injected downstream of compressor 214. Thus, a rotorcraft that includes one or more turboshaft engines 200 with the disclosed oxidizer and coolant injection systems incorporated therewith is capable of operating in the low density altitude flight mode when the oxidizer and the coolant are not injected into the gas path but is also capable of operating in the high density altitude flight mode when the oxidizer and the coolant are injected into the gas path, thereby simulating a reduced density altitude environment for turboshaft engine 200 and increasing the altitude density ceiling of the rotorcraft.

Figure 5A:
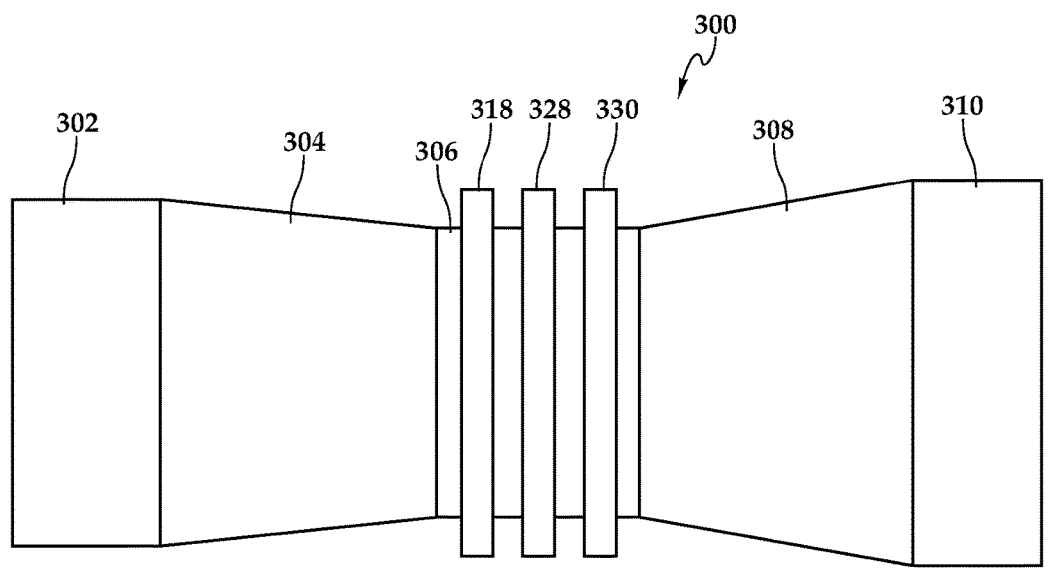
FIGS. 5A-5B are schematic side and partial cross sectional views of an exemplary turboshaft engine operable to provide a rotorcraft with a low altitude density flight mode and a high density altitude flight mode in accordance with embodiments of the present disclosure.
Figure 5B:
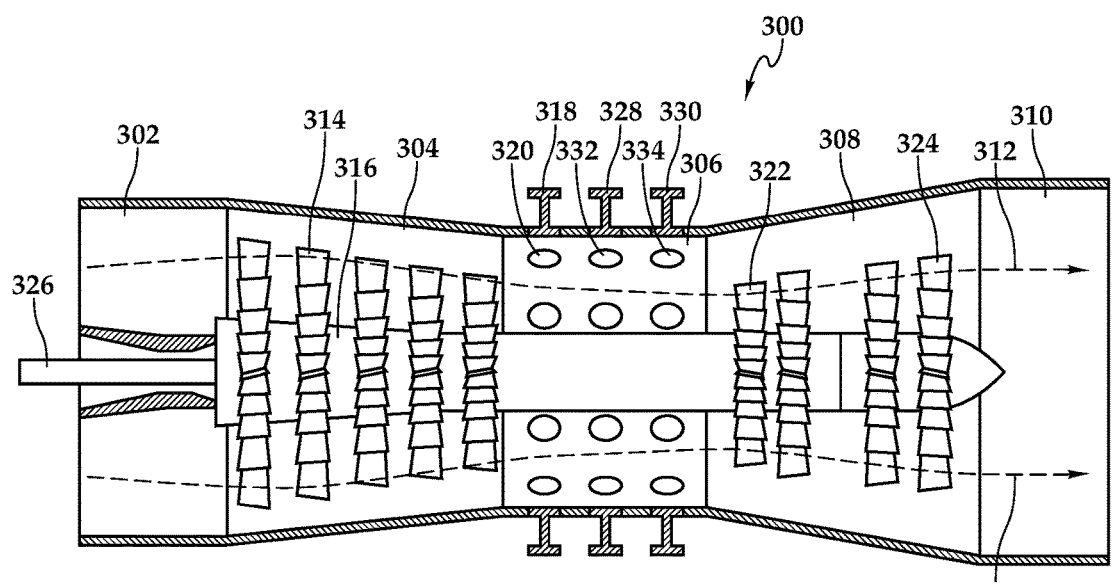

Referring now to FIGS. 5A-5B, a turboshaft engine 300 for use in a rotorcraft having a low density altitude flight mode and a high density altitude flight mode is disclosed in further detail. Turboshaft engine 300 includes an air inlet section 302, a compressor section 304, a combustor section 306, a turbine section 308 and an exhaust section 310, which collectively form a gas path, depicted as dashed lines 312, through turboshaft engine 300. In operation, ambient air drawn into air inlet section 302 enters compressor section 304 wherein the air is compressed. In the illustrated embodiment, compressor section 304 includes a five-stage axial compressor 314 having a series of rotating blades that are mounted on a compressor shaft 316. Preferably, compressor 314 includes a series of stationary blades (not pictured) after each set of rotating blades. The rotating blades accelerate the air while the stationary blades decelerate and redirect the air flow, thereby compressing the air. The compressed air is then mixed with fuel injected into combustor section 306 from a fuel injection system 318 including injectors 320 and ignited therein. The hot combustion gases expand and pass at high speed through turbine section 308 causing rotation of the turbine blades therein. In the illustrated embodiment, turbine section 308 includes a two-stage compressor turbine 322 and a two-stage power turbine 324. The blades of compressor turbine 322 are mounted on compressor shaft 316 such that rotation of compressor turbine 322 drives compressor 314. The blades of power turbine 324 are mounted on an output shaft 326 that is used to power the drive system and rotor of the associated rotorcraft.

To operate a rotorcraft at high density altitude, such as above 6000 feet and 95 degrees Fahrenheit, turboshaft engine 300 includes power augmentation or emergency power capabilities that are referred to herein as a high density altitude flight mode. In the disclosed high density altitude flight mode, for example, the power output of turboshaft engine 300 may be temporality increased to produce approximately the same power that turboshaft engine 300 would produce at sea level standard day. To achieve the high density altitude flight mode of the rotorcraft, turboshaft engine 300 includes an oxidizer injection system 328 and a coolant injection system 330. In the illustrated embodiment, oxidizer injection system 328 is coupled to turboshaft engine 300 at combustor section 306 and is operable to selectively inject an oxidizer into gas path 312 downstream of compressor 314 via injectors 332. Coolant injection system 330 is coupled to turboshaft engine 300 such that coolant is selectively injected downstream of compressor 314 but upstream of compressor turbine 322 and compressor turbine 324. The injected oxidizer increases the oxygen content of the gas stream in combustor section 306 which allows a greater quantity of fuel to be burned, thereby increasing the temperature and volume of the combustion gases as well as the power output of turboshaft engine 300. As the increased temperature of the combustion gases may be detrimental to downstream elements such as the blades of compressor turbine 322 and power turbine 324, the coolant is injected upstream of compressor turbine 322 and power turbine 324 to counteract this effect. The coolant reduced the temperature of the gas stream entering compressor turbine 322 and power turbine 324 due to vaporization of the coolant, which removes heat from the gas stream.

Alternatively or additionally, coolant may be injected into turbine section 308 between compressor turbine 322 and power turbine 324. Thus, a rotorcraft that includes one or more turboshaft engines 300 with the disclosed oxidizer and coolant injection systems incorporated therewith is capable of operating in the low density altitude flight mode when the oxidizer and the coolant are not injected into the gas path but is also capable of operating in the high density altitude flight mode when the oxidizer and the coolant are injected into the gas path, thereby simulating a reduced density altitude environment for turboshaft engine 300 and increasing the altitude density ceiling of the rotorcraft.

Figure 6A:
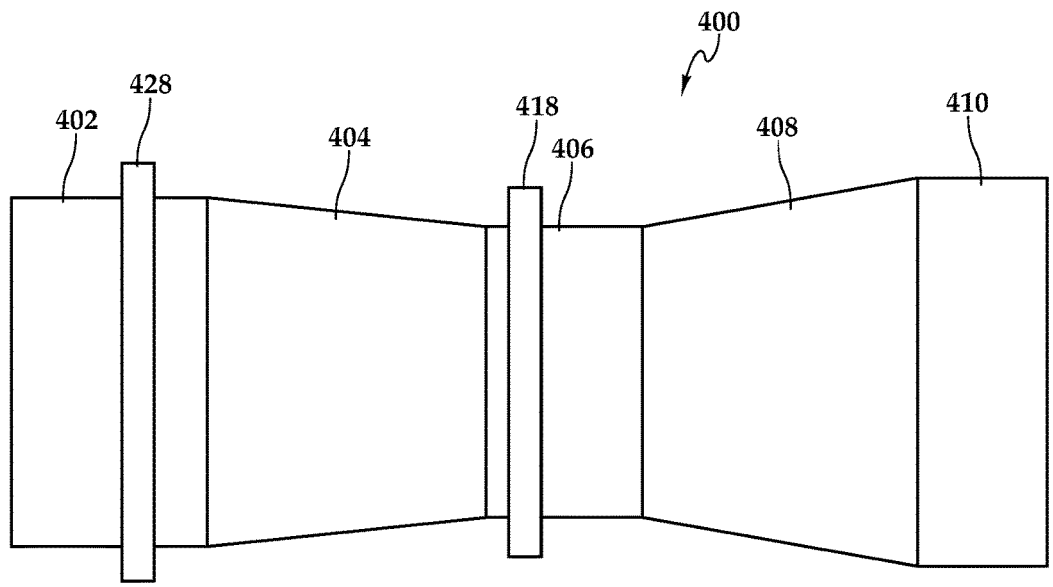
FIGS. 6A-6B are schematic side and partial cross sectional views of an exemplary turboshaft engine operable to provide a rotorcraft with a low altitude density flight mode and a high density altitude flight mode in accordance with embodiments of the present disclosure.
Figure 6B:
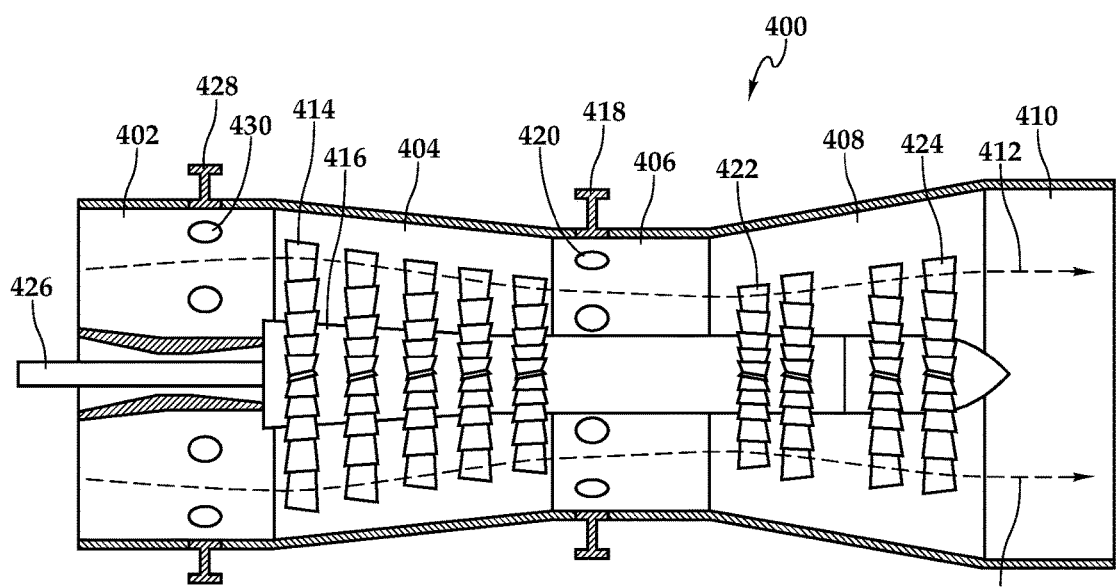

Referring now to FIGS. 6A-6B, a turboshaft engine 400 for use in a rotorcraft having a low density altitude flight mode and a high density altitude flight mode is disclosed in further detail. Turboshaft engine 400 includes an air inlet section 402, a compressor section 404, a combustor section 406, a turbine section 408 and an exhaust section 410, which collectively form a gas path, depicted as dashed lines 412, through turboshaft engine 400. In operation, ambient air drawn into air inlet section 402 enters compressor section 404 wherein the air is compressed. In the illustrated embodiment, compressor section 404 includes a five-stage axial compressor 414 having a series of rotating blades that are mounted on a compressor shaft 416. Preferably, compressor 414 includes a series of stationary blades (not pictured) after each set of rotating blades. The rotating blades accelerate the air while the stationary blades decelerate and redirect the air flow, thereby compressing the air. The compressed air is then mixed with fuel injected into combustor section 406 from a fuel injection system 418 including injectors 420 and ignited therein. The hot combustion gases expand and pass at high speed through turbine section 408 causing rotation of the turbine blades therein. In the illustrated embodiment, turbine section 408 includes a two-stage compressor turbine 422 and a two-stage power turbine 424. The blades of compressor turbine 422 are mounted on compressor shaft 416 such that rotation of compressor turbine 422 drives compressor 414. The blades of power turbine 424 are mounted on an output shaft 426 that is used to power the drive system and rotor of the associated rotorcraft.

To operate a rotorcraft at high density altitude, such as above 6000 feet and 95 degrees Fahrenheit, turboshaft engine 400 includes power augmentation or emergency power capabilities that are referred to herein as a high density altitude flight mode. In the disclosed high density altitude flight mode, for example, the power output of turboshaft engine 400 may be temporality increased to produce approximately the same power that turboshaft engine 400 would produce at sea level standard day. To achieve the high density altitude flight mode of the rotorcraft, turboshaft engine 400 includes an integrated fluid injection system 428 that is coupled to turboshaft engine 400 at air intake section 402 and is operable to selectively inject an oxidizer and a coolant into gas path 412 upstream of compressor 414 via injectors 430. The injected oxidizer increases the oxygen content of the gas stream entering combustor section 406 which allows a greater quantity of fuel to be burned, thereby increasing the temperature and volume of the combustion gases as well as the power output of turboshaft engine 400. As the increased temperature of the combustion gases may be detrimental to downstream elements such as the blades of compressor turbine 422 and power turbine 424, the injected coolant counteracts this effect. The coolant reduced the temperature of the gas stream entering compressor 414 due to vaporization of the coolant, which removes heat therefrom. Thus, a rotorcraft that includes one or more turboshaft engines 400 with the disclosed integrated fluid injection system incorporated therewith is capable of operating in the low density altitude flight mode when the oxidizer and the coolant are not injected into the gas path but is also capable of operating in the high density altitude flight mode when the oxidizer and the coolant are injected into the gas path, thereby simulating a reduced density altitude environment for turboshaft engine 400 and increasing the altitude density ceiling of the rotorcraft.

Figure 7:
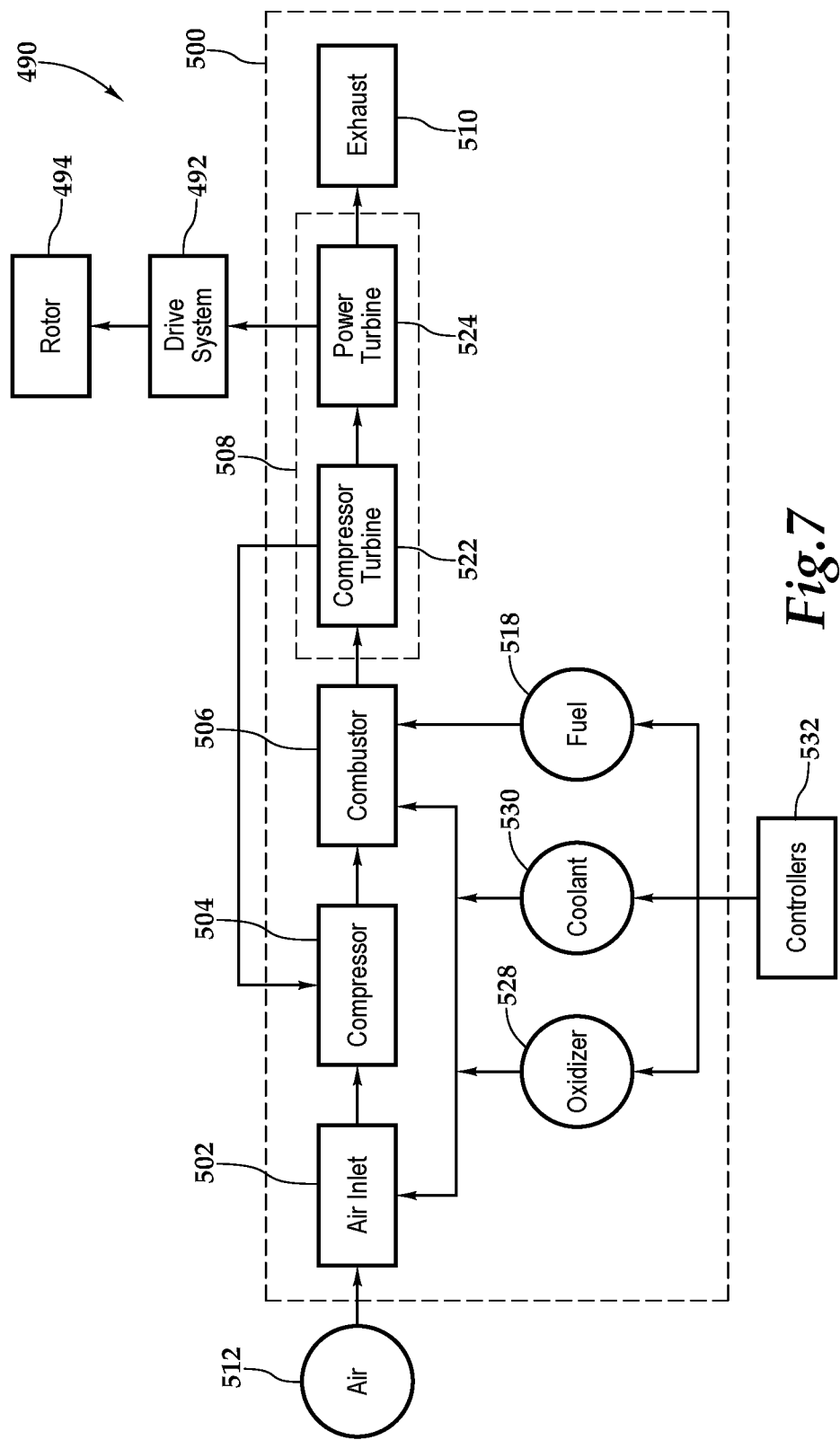
FIG. 7 is a block diagram of an exemplary propulsion system operable to provide a rotorcraft with a low altitude density flight mode and a high density altitude flight mode in accordance with embodiments of the present disclosure.

Referring now to FIG. 7, a propulsion system 490 for use in a rotorcraft having a low density altitude flight mode and a high density altitude flight mode is disclosed in further detail. Propulsion system 490 includes a turboshaft engine 500, a drive system 492 and a rotor 494. Drive system 492 may include one or more gearboxes that are operable to transfer torque and rotational energy from turboshaft engine 500 to rotor 494 via one or more shaft elements. Drive system 492 may include transmission elements that provide for gear reduction to adjust the rotational speed of turboshaft engine 500 to the desired rotational speed of rotor 494. Rotor 494 may be the main rotor of a helicopter, a proprotor of a tiltrotor aircraft or other similar rotary wing element of a rotorcraft.

Turboshaft engine 500 includes an air inlet section 502, a compressor section 504, a combustor section 506, a turbine section 508 and an exhaust section 510, which collectively form a gas path through turboshaft engine 500. In operation, ambient air 512 drawn into air inlet section 502 enters compressor section 504 wherein the air is compressed. The compressed air is then mixed with fuel injected into combustor section 506 from a fuel system 518 that may include a fuel storage tank, a fuel injection system, a fuel control system and fuel. The air and fuel mixture is ignited in combustor section 506 to produce hot combustion gases that expand and pass at high speed through turbine section 508 causing rotation of the turbine blades therein. In the illustrated embodiment, turbine section 508 includes a compressor turbine 522 and a power turbine 524. The blades of compressor turbine 522 are mounted on a common shaft with the compressor such that rotation of compressor turbine 522 drives the compressor. The blades of power turbine 524 are mounted on an output shaft that is used to power drive system 492 and rotor 494.

To operate a rotorcraft at high density altitude, such as above 6000 feet and 95 degrees Fahrenheit, turboshaft engine 500 includes power augmentation or emergency power capabilities that are referred to herein as a high density altitude flight mode. In the disclosed high density altitude flight mode, for example, the power output of turboshaft engine 500 may be temporality increased to produce approximately the same power that turboshaft engine 500 would produce at sea level standard day. To achieve the high density altitude flight mode of the rotorcraft, turboshaft engine 500 includes an oxidizer system 528 and a coolant system 530. Oxidizer system 528 may include an oxidizer storage tank, an oxidizer injection system, an oxidizer control system and oxidizer. Likewise, coolant system 530 may include a coolant storage tank, a coolant injection system, a coolant control system and coolant. In the illustrated embodiment, oxidizer system 528 may inject oxidizer into the gas path either upstream of compressor section 504, downstream of compressor section 504 or both upstream and downstream of compressor section 504. Likewise, coolant system 530 may inject coolant into the gas path either upstream of compressor section 504, downstream of compressor section 504 or both upstream and downstream of compressor section 504. As illustrated, oxidizer system 328 and coolant system 530 are in fluid communication with air intake section 502 and combustor section 506, however, as discussed above, coolant system 530 may alternatively or additionally be in fluid communication with turbine section 508.

Propulsion system 490 also includes one or more controllers 532 that are operable to activate oxidizer system 528 and coolant system 530 as well as adjust the injection rate from fuel system 518 to maintain the desired stoichiometry in combustor section 506. Preferably, when it is desirable to transitioning the rotorcraft from low density altitude flight mode to high density altitude flight mode, the pilot engages controllers 532 via a pilot input such as one or more buttons, toggle switches, dials, a touch screen or other suitable pilot interface. Controllers 532 may give the pilot the authority to determine when to enter high density altitude flight mode and the duration of high density altitude flight mode. In addition, controllers 532 may give the pilot the authority to determine the degree of high density altitude flight mode by providing the pilot with the ability to determine the rate at which oxidizer, coolant and extra fuel are injected into the gas path. For example, the pilot may be able to select a power boost of between about 10 percent and about 20 percent, between about 20 percent and about 30 percent, between about 30 percent and about 40 percent, between about 40 percent and about 50 percent or some other power boost selection or range. Alternatively or additionally, transitioning the rotorcraft from low density altitude flight mode to high density altitude flight mode may be partially or fully automated according to suitable flight control laws.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A rotorcraft having a standard density altitude ceiling flight mode and an increased density altitude ceiling flight mode, the rotorcraft comprising:
    a turboshaft engine forming a gas path in sequence through an air inlet section, a compressor section, a combustor section, a turbine section and an exhaust section;
    a drive system coupled to the engine, the drive system operable responsive to rotation of at least a portion of the turbine section;
    a rotor operable to receive torque and rotational energy from the drive system;
    a fuel injection system coupled to the engine, the fuel injection system operable to inject fuel into the combustor section;
    an oxidizer injection system coupled to the engine, the oxidizer injection system operable to selectively inject an oxidizer into the gas path; and
    a coolant injection system coupled to the engine downstream of the oxidizer injection system, the coolant injection system operable to selectively inject a coolant into the gas path downstream of the injection of the oxidizer;
    wherein, the rotorcraft is operating in the standard density altitude ceiling flight mode when the oxidizer and the coolant are not injected into the gas path; and
    wherein, the rotorcraft is operating in the increased density altitude ceiling flight mode when the oxidizer and the coolant are injected into the gas path.

2. The rotorcraft as recited in claim 1 wherein the oxidizer injection system and the coolant injection system are coupled to the engine such that the oxidizer and the coolant are injected into the gas path upstream of the compressor section.

3. The rotorcraft as recited in claim 1 wherein the oxidizer injection system and the coolant injection system are coupled to the engine such that the oxidizer and the coolant are injected downstream of the compressor section.

4. The rotorcraft as recited in claim 1 wherein the oxidizer injection system is coupled to the engine such that the oxidizer is injected upstream of the compressor section and the coolant injection system is coupled to the engine such that the coolant is injected downstream of the compressor section.

5. The rotorcraft as recited in claim 1 wherein the oxidizer injection system and the coolant injection system further comprise an integrated fluid injection system.

6. The rotorcraft as recited in claim 1 wherein the oxidizer further comprises nitrous oxide.

7. The rotorcraft as recited in claim 1 wherein the oxidizer is selected from the group consisting of nitrous oxide, nitrogen tetroxide, hydrogen peroxide, liquid oxygen and liquid air.

8. The rotorcraft as recited in claim 1 wherein the coolant further comprises a water-alcohol mixture.

9. The rotorcraft as recited in claim 1 wherein the coolant is selected from the group consisting of water, a water-alcohol mixture and ammonia.

10. The rotorcraft as recited in claim 1 wherein the turbine section further comprises a compressor turbine and a power turbine, wherein the compressor turbine drives the compressor section and wherein the power turbine drives the drive system.

11. The rotorcraft as recited in claim 1 further comprising at least one pilot operated controller operably coupled to the oxidizer injection system and the coolant injection system to selectively inject the oxidizer and the coolant into the gas path.

12. The rotorcraft as recited in claim 1 further comprising at least one pilot operated controller operably coupled to the oxidizer injection system and the coolant injection system to selectively inject the oxidizer and the coolant into the gas path and to selectively control the amount of oxidizer and coolant injected into the gas path.

13. The rotorcraft as recited in claim 1 wherein operating in the increased density altitude ceiling flight mode simulates a reduction in the density altitude experienced by the engine, thereby increasing the density altitude ceiling of the rotorcraft.

14. The rotorcraft as recited in claim 1 wherein the rotor further comprises a main rotor of a helicopter.

15. The rotorcraft as recited in claim 1 wherein the rotor further comprises a proprotor of a tiltrotor aircraft.

16. A method of increasing a density altitude ceiling for a rotorcraft, the method comprising:

establishing a gas path in sequence through an air inlet section, a compressor section, a combustor section, a turbine section and an exhaust section of a turboshaft engine;

operating a drive system responsive to rotation of at least a portion of the turbine section;

rotating a rotor responsive to receiving torque and rotational energy from the drive system;

injecting an oxidizer into the gas path; and injecting a coolant into the gas path downstream of the injection of the oxidizer to simulate a reduction in the density altitude experienced by the engine, thereby increasing the density altitude ceiling of the rotorcraft.

17. The method as recited in claim 16 wherein injecting the oxidizer and the coolant into the gas path further comprises injecting nitrous oxide and a water-alcohol mixture into the gas path.

18. The method as recited in claim 16 wherein injecting the oxidizer and the coolant into the gas path further comprises injecting the oxidizer and the coolant upstream of the compressor section.

19. The method as recited in claim 16 wherein injecting the oxidizer and the coolant into the gas path further comprises injecting the oxidizer and the coolant downstream of the compressor section.

20. The method as recited in claim 16 wherein injecting the oxidizer and the coolant into the gas path further comprises increasing a power output of the engine between 20 percent and 30 percent.

\* \* \* \* \*